United States Patent [19]

Hardison

[11] Patent Number: 4,482,524

[45] Date of Patent: Nov. 13, 1984

[54] AUTOCIRCULATION APPARATUS

[75] Inventor: Leslie C. Hardison, Barrington, Ill.

[73] Assignee: ARI Technologies, Inc., Palatine, Ill.

[21] Appl. No.: 210,026

[22] Filed: Nov. 24, 1980

Related U.S. Application Data

[62] Division of Ser. No. 873,941, Jan. 31, 1978, Pat. No. 4,238,462.

[51] Int. Cl.$^3$ .................. B01D 53/36; B01J 10/00; B01J 19/26
[52] U.S. Cl. ............................ 422/170; 55/256; 261/17; 261/77; 261/DIG. 9; 422/193; 422/231
[58] Field of Search .............. 423/210, 220, 224, 226, 423/659; 422/170, 193, 197, 168, 231; 55/73, 249, 256; 261/21-23 R, 146-148, 123, 17, 77, DIG. 9

[56] References Cited

U.S. PATENT DOCUMENTS

| | | | |
|---|---|---|---|
| 2,832,703 | 4/1958 | Bell et al. | 422/231 |
| 3,086,841 | 4/1963 | Hart et al. | 261/77 |
| 3,759,669 | 9/1973 | Aaron et al. | 422/231 |
| 3,897,219 | 7/1975 | Sibeud et al. | 422/176 |
| 3,998,613 | 12/1976 | Attig | 261/17 |
| 4,094,643 | 6/1978 | Cook et al. | 422/231 |
| 4,239,515 | 12/1980 | Yanagioka et al. | 422/168 |

*Primary Examiner*—Bradley Garris

*Attorney, Agent, or Firm*—Marshall, O'Toole, Gerstein, Murray & Bicknell

[57] ABSTRACT

Apparatus for contacting a liquid reaction solution with a gas in separate reaction chambers within a single reaction vessel wherein the liquid reaction solution is continuously circulated between a first reaction chamber and a second reaction chamber within the reaction vessel but providing at least two side-by-side reaction chambers in open flow communication at their upper and lower ends with a gas supply means associated with each said chamber for introducing a gas in a finely divided form into the lower ends of each said chamber, and said gas supply means including flow control means whereby the rate of upward flow of gas in one of the chambers is greater than the rate of upward flow of gas in the other chamber so as to lower the density of the liquid reaction solution in the one chamber and provide continuous upward flow of liquid reaction solution and gas in the one chamber and downward flow of liquid reaction solution countercurrent to the flow of gas in the other chamber. The process and apparatus are particularly adapted for continuously carrying out two distinct chemical reactions between a liquid reaction solution and two different gases in a single reaction vessel, such as a catalytic oxidation-reduction process for removing hydrogen sulfide gas from a process gas stream.

4 Claims, 4 Drawing Figures

AUTOCIRCULATION APPARATUS

This is a divisional application of co-pending application Ser. No. 873,941, filed Jan. 31, 1978 now U.S. Pat. No. 4,238,462.

This invention relates generally to reacting gases with a liquid in separate reaction zones within a single vessel and more particularly to an improved method and apparatus for continuously removing hydrogen sulfide gas from a fluid stream by reacting with a catalytic solution and continuously regenerating the catalytic solution by reacting with an oxygen containing gas.

In a catalytic process for removing hydrogen sulfide gas ($H_2S$) from a fluid stream using a ferric iron catalyst, such as a ferric iron chelate, the ferric iron is reduced to the ferrous state when reacted with hydrogen sulfide. The series of reactions involved in catalytically oxidizing hydrogen sulfide gas to form elemental sulfur using a ferric iron chelate catalytic reagent can be represented by the following equations:

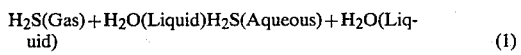
$$H_2S(Gas) + H_2O(Liquid) \rightleftharpoons H_2S(Aqueous) + H_2O(Liquid) \quad (1)$$

$$H_2S(Aqueous) \rightleftharpoons H^+ + HS^- \quad (2)$$

$$HS^- \rightleftharpoons H^+ + S^= \quad (3)$$

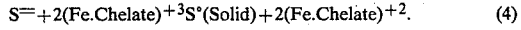
$$S^= + 2(Fe.Chelate)^{+3} \rightarrow S°(Solid) + 2(Fe.Chelate)^{+2} \quad (4)$$

By combining equations (1) through (4) the resulting equation is:

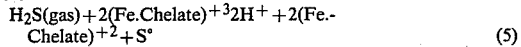
$$H_2S(gas) + 2(Fe.Chelate)^{+3} \rightarrow 2H^+ + 2(Fe.Chelate)^{+2} + S° \quad (5)$$

In order to have an economical workable process to effect catalytic oxidation of the hydrogen sulfide, it is essential that the hydrogen sulfide gas be brought continuously into intimate contact with a large volume of the chelated iron solution and that the ferrous iron chelate formed in the above described manner be continuously regenerated by oxidizing to ferric iron chelate by intimately contacting the reaction solution with dissolved oxygen, preferably in the form of ambient air. The series of reactions which take place when regenerating the required ferric iron chelate can be represented by the following equations:

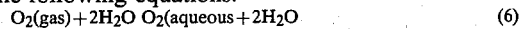
$$O_2(gas) + 2H_2O \rightleftharpoons O_2(aqueous) + 2H_2O \quad (6)$$

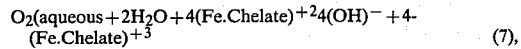
$$O_2(aqueous) + 2H_2O + 4(Fe.Chelate)^{+2} \rightarrow 4(OH)^- + 4(Fe.Chelate)^{+3} \quad (7)$$

or

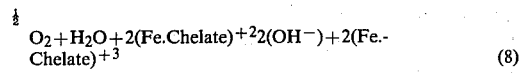
$$\tfrac{1}{2}O_2 + H_2O + 2(Fe.Chelate)^{+2} \rightarrow 2(OH^-) + 2(Fe.Chelate)^{+3} \quad (8)$$

By combining equations (6) through (8), the resulting equation is:

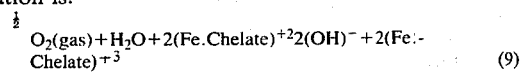
$$\tfrac{1}{2}O_2(gas) + H_2O + 2(Fe.Chelate)^{+2} \rightarrow 2(OH)^- + 2(Fe.Chelate)^{+3} \quad (9)$$

It will be evident from the foregoing equations that theoretically two moles of ferric iron must be supplied to the reaction zone in which the hydrogen sulfide gas is oxidized to form elemental sulfur for each mole of hydrogen sulfide gas treated, and in actual practice considerably more than the theoretical amount of iron must be used. In a continuous process of absorbing or removing hydrogen sulfide by contacting with a catalytic ferric iron solution a large volume of catalytic solution must be circulated continuously between an absorber zone and an oxidizer zone where the reduced ferrous iron is oxidized to the ferric iron state. And, in order to avoid using high concentrations of iron in the catalytic reagent, the rate of circulation should be high.

The catalytic oxidation-reduction reactions for continuously removing hydrogen sulfide or the like from a fluid stream have heretofore been carried out concurrently in the same reaction vessel by means of a process which can be referred to as aerobic operation or by means of a process in which the oxidation and reduction steps are carried out in separate reaction vessels in what can be referred to as anaerobic operation (see U.S. Pat. No. 3,897,219). While an anaerobic operation may have certain advantages over an aerobic operation for treating some gas streams which must be recovered after $H_2S$ removal, there is the extra expense involved in providing additional equipment and the continuous pumping of large volumes of liquid from one vessel to the other increases operating costs.

It is therefore an object of the present invention to provide an improved method and means for continuously carrying out two distinct chemical reactions between a liquid and two different gases within a single vessel.

It is a further object of the present invention to provide an improved method and means for carrying out an oxidation-reduction reaction sequentially in a solution within a single vessel.

It is a further object of the present invention to provide an improved method and means for continuously removing hydrogen sulfide from a fluid stream in which hydrogen sulfide gas is contacted with a catalytic oxidation-reduction reaction solution.

Another object of the present invention is to provide an improved chemical reaction vessel in which hydrogen sulfide gas is continuously removed from a fluid stream.

Other objects of the present invention will be apparent to those skilled in the art from the following detailed description and claims to follow when read in conjunction with the accompanying drawing wherein;

Figure 1:
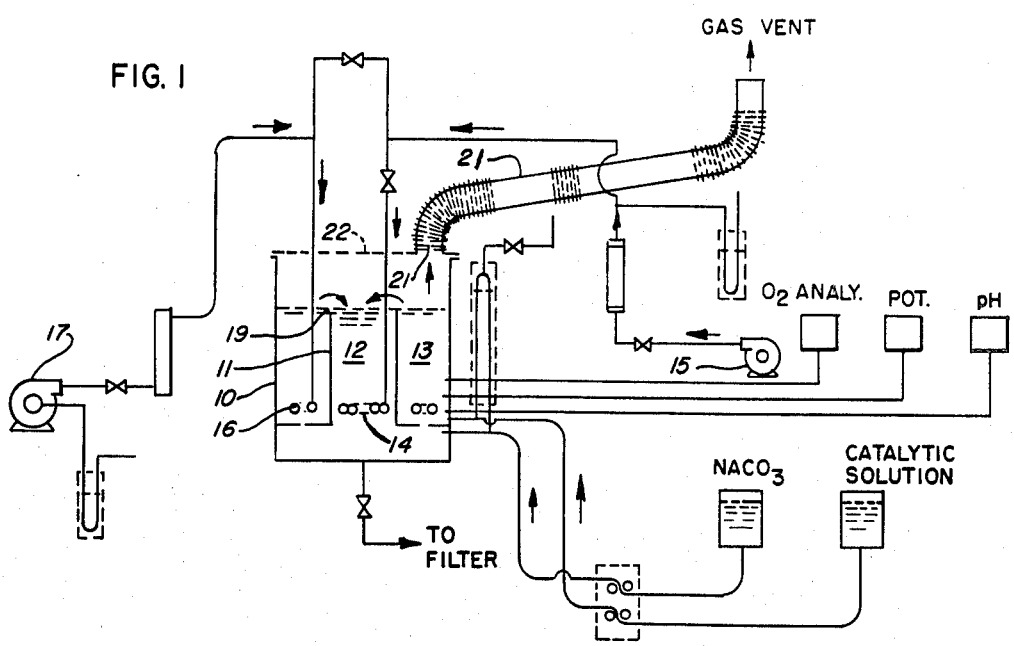
FIG. 1 is a schematic diagram of apparatus of the present invention which is used in the applicant's process for continuously removing hydrogen sulfide gas from a fluid stream by a catalytic oxidation-reduction process.

In achieving the foregoing objects and as schematically illustrated in FIG. 1 of the drawing a vertically disposed reaction vessel 10 is provided for carrying out a catalytic oxidation-reduction process for removing hydrogen sulfide from a gas stream in which (1) hydrogen sulfide is absorbed and oxidized to form elemental sulfur by reacting with a liquid reagent containing ferric iron during which reaction the ferric iron is reduced to ferrous iron and (2) the ferrous iron in the catalytic solution is regenerated to ferric iron by reacting with oxygen. The reaction vessel has a generally cylindrical form and is provided with an open-ended cylindrical divider or separator 11 mounted co-axially within the vessel 10 with the upper and lower ends of the separator 11 spaced from the upper and lower end walls of the vessel 10 and defining a cylindrical central reaction zone or chamber 12 and a surrounding annular reaction zone or chamber 13. The inlet gas stream containing the hydrogen sulfide gas in finely divided form is introduced into cylindrical central reaction zone 12 through sparger rings 14 disposed within the reaction vessel 10 adjacent the lower end of open-ended cylindrical separator 11 with a blower 15 associated therewith for regulating the feed rate to the reaction zone. The outer annular reaction zone 13 is also provided adjacent the lower end thereof with sparger rings 16 which are connected with a blower 17 adapted to supply air in a finely divided form to the annular reaction zone 13. Both reaction zones are kept filled with the liquid reagent at all times without, however, completely filling the vessel 10. The sparger rings 16 preferably are adapted to supply air to the annular reaction zone 13 in sufficient volume to lower the density of the liquid reagent therein and create a positive differential head between the reaction zone 13 and the central reaction zone 12 in addition to providing sufficient oxygen to the reaction zone 13 for oxidizing the ferrous iron of the catalytic solution to ferric iron.

In order to avoid a reduction in the rate of flow of hydrogen sulfide containing process gas into the reaction zone 12 due to clogging of the small openings in the sparger rings 14 by ferrous sulfide which may be formed as a by-product during the absorption of hydrogen sulfide gas, the sparger rings 14 are preferably made sufficiently flexible, as by forming of plastic tubing, so as to permit expansion of the gas discharge openings therein by the application of a mechanical compressive force or by increasing the gas pressure therein so as to effectively dislodge accumulation of the ferrous sulfide. Provision is also preferably made for adjusting the position of sparger rings 14 and 16 axially within the respective reaction zones in order to change the amount of aeration in the zones and thereby change the rate of circulation of the liquid reagent catalytic solution between the respective zones, as we describe hereinafter.

In operating, after adding liquid reagent comprising a catalytic ferric iron solution to the vessel 10 in an amount sufficient to cover the upper end 19 of the separator 11 and establishing the flow of hydrogen sulfide containing gas in the central reaction zone 12, the rate of flow of the oxygen containing gas, such as air, into the annular reaction zone 13 is adjusted so that the density of the liquid reagent in the annular reaction zone 13 is less than the density of the liquid reagent in the central reaction zone 12. With the density of the liquid reagent in the outer annular reaction zone 13 less than the liquid reagent in the central reaction zone 12, the liquid level in the annular reaction zone 13 rises above the liquid level in the central reaction zone 12 and the liquid reagent falls inwardly over the upper end 19 of the separator 11 into the cylindrical central reaction zone 12. And, since there is open passage of liquid from the bottom of the central reaction zone 12 to the bottom of the annular reaction zone 13, the liquid reagent flows upwardly in the annular reaction zone 13 and downwardly in the central reaction zone 12 while the reaction gases are flowing upwardly through each of the reaction zones, thus providing an autocirculation of the catalytic solution within the reaction vessel 10. The gases from the reaction zones 12 and 13 are vented to the atmosphere through passage 21 in the cover 22. As liquid reagent is withdrawn from the vessel 10 by entrainment with reaction product material or lost by evaporation, fresh liquid reagent or recycled reagent is added to maintain the reaction zones 12, 13 filled.

In the event the composition of the process gas feed stream being treated or the solution requires increasing the rate of process gas flow into the central reaction zone 12 where $H_2S$ gas is absorbed above the rate at which air is introduced into the reaction zone 13, the direction of the flow of the catalytic solution in the vessel 10 will be reversed so that liquid flows up upwardly through the central reaction zone 12 and downwardly in the annular reaction zone 13 in reaction vessel 10.

Figure 2:
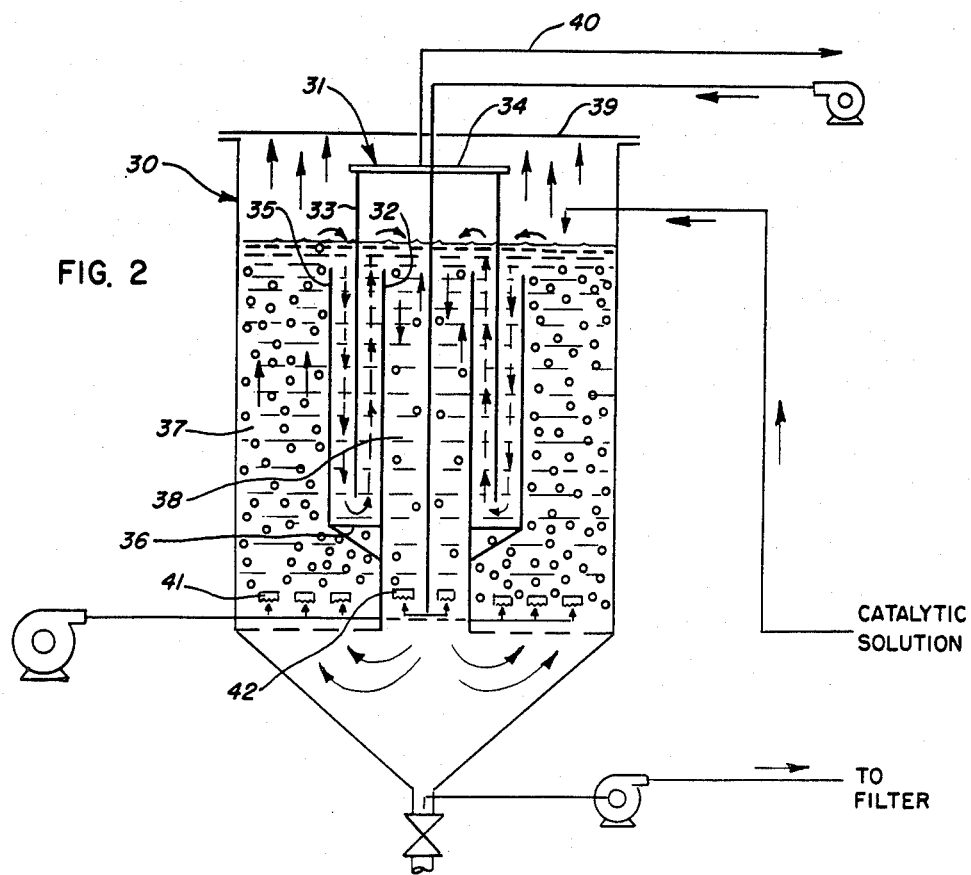
FIG. 2 is a modified form of an apparatus which can be used for carrying out the process illustrated in FIG. 1.

In order to avoid discharging incompletely treated process gas containing hydrogen sulfide into the atmosphere due to a malfunction of the apparatus or process, or when further use of the process gas is an object of the treatment process the upper end of the central reaction zone 12 can be provided with a gas collection hood, as shown in FIG. 2 of the drawing; wherein the hood 31 is spaced above the upper end of the cylindrical separator 32 of the reaction vessel 30 with a depending skirt section 33 extending axially downwardly from the end wall 34 thereof below the surface of the liquid reagent contained within the annular reaction zone 37. The cylindrical skirt section 33 is disposed in spaced surrounding relationship with the lateral cylindrical wall of the separator 32. A cylindrical spacer section 35 is mounted in spaced relationship with the depending skirt 33 and the lower end thereof extends below the lower end of the depending skirt 33. The upper edge of the spacer 35 is disposed slightly below the level of liquid in the reaction zone 37. A transverse wall section 36 extending from the lower end of the spacer section 35 to the separator 32 forming an annular liquid flow passage downwardly between the spacer section 35 and the skirt section 33, around the lower end of the depending skirt section 33 and upwardly between the skirt section 33 and separator 32 permitting liquid reagent to flow from the annular reaction zone 37 into the central reaction zone 38 without permitting a significant volume of gas to flow from the annular reaction zone 37 into the central reaction zone 38 and keeping the gas which passes upwardly through the central reaction zone 38 from entering the annular reaction zone 37 and being discharged into the atmosphere. The gas from the central reaction zone 38 is collected in the hood 31 and is conveyed therefrom through the cover 39 by means of the conduit 40. When the flow of gas into the annular reaction zone 37 through the sparger 41 is greater than the flow of gas through sparger 42 and the density of the liquid reagent in the reaction zone 38, the flow of liquid reagent will be downwardly in the reaction zone 38 and upwardly in the annular reaction zone 37, as described in connection with the apparatus of FIG. 1.

Figure 3:
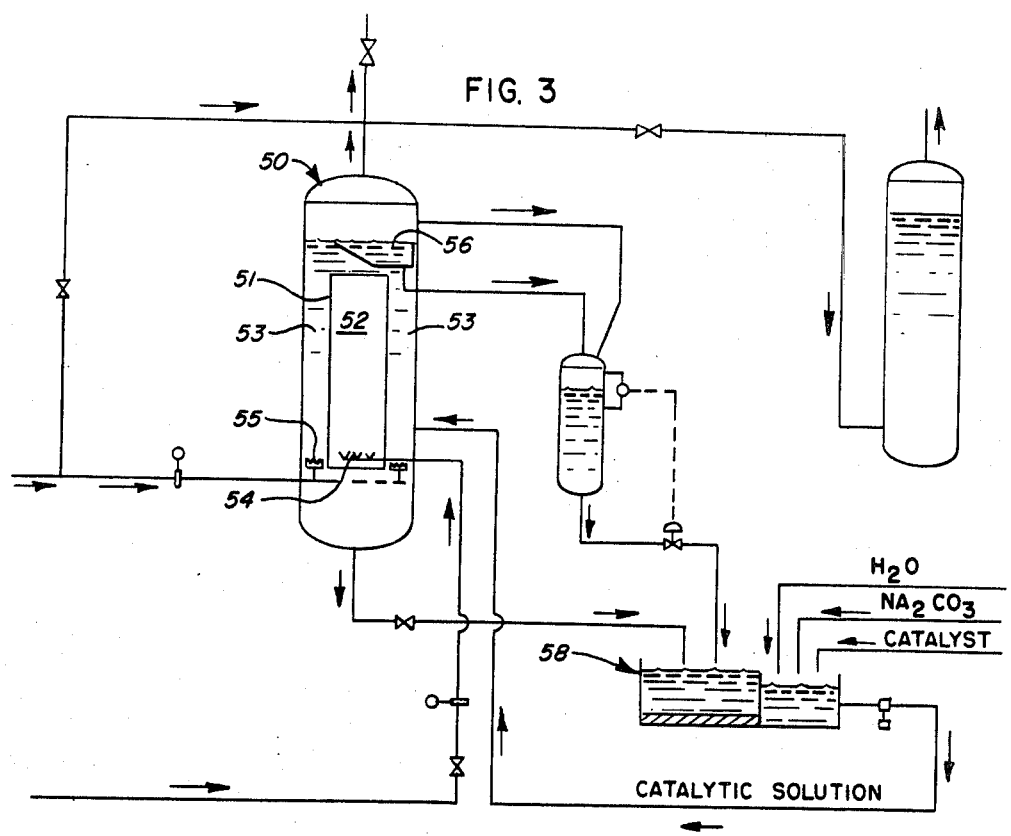
FIG. 3 is a schematic diagram of modified apparatus which can be used for carrying out the process of the present invention.

In a modified form of apparatus for removing hydrogen sulfide gas from a process gas stream by a catalytic oxidation-reduction process shown in FIG. 3 of the drawing, the cylindrical reaction vessel 50 having the approximate dimension of 6 feet in diameter and 30 feet in length is provided with an open ended cylindrical separator 51 disposed co-axially therein and spaced from both ends of the vessel 50. The cylindrical separator 51 has the approximate dimensions of 1.5 feet in diameter and 14 feet in length. The cylindrical separator 51 divides the vessel 50 into a central reaction zone 52 and an annular reaction zone 53 which surrounds the central reaction zone 52. Sparger rings 54 are mounted adjacent the lower end of the separator 51 and are adapted to supply oxygen containing gas (air) to the lower end of the central reaction zone 52. The annular reaction zone 53 also is provided with flexbile sparger rings 55 adjacent the lower end of the separator 51 and are adapted to provide hydrogen sulfide containing gas to the annular reaction zone 53. A liquid level control means 56 is provided spaced downwardly from the upper end of the reaction vessel 50 but above the upper end of the separator 51 for maintaining the liquid reaction reagent at a predetermined level within the vessel 50. Means are provided at the lower end of the separator 51 for collecting and removing reaction product from the lower end of the reaction vessel 50 and a solid-liquid separator and liquid recycling means 58 for returning liquid reagent to the reaction vessel 50 are also provided.

In the apparatus of FIG. 3 the composition of the process gas being treated is such that the process gas is supplied to the annular reaction zone 53 in larger volume than the volume of oxygen containing gas supplied to the central reaction zone 52. Thus, the flow of liquid reagent is upwardly in the annular reaction zone 53 and downwardly in the central reaction zone 52. Typical operating conditions and material balance for an oxidation-reduction process using the above described apparatus is shown in the following tables:

TABLE I

| Design Basis | |
|---|---|
| Gas Properties | |
| Flow $H_2S$, SCFM | 694.4/6.7 Atm. |
| | 1.0 MM SCFD) |
| Flow Air, SCFM | 22.7/6.7 Atm. |
| $H_2S$ in. ppm | 1294 (80 grains/100 SCF) |
| $H_2S$ out, ppm | 4 (¼grains/100 SCF) |
| Efficiency, % | 99.7 |
| Product Distribution | |
| Theoretical Sulfur, lb/hr | 4.8 (0.05 LT/Day) |
| Actual Sulfur, lb/hr | 4.5 (0.05 LT/Day) |
| $Na_2S_2O_3$, lb/hr | 0.5 |
| $Na_2SO_4$, lb/hr | 0.1 |
| $Na_2CO_3$, reg'd., lb/hr | 0.4 |
| Operating Parameters | |
| Iron/$H_2S$ Mol Ratio | 4.5 |
| Air/Theoretical Air | 10.0 |
| Iron/Solution, wt. ppm | 500 |
| Solution Alkalinity, pH | 7–8.5 |
| Solution Volume in Absorber, pH, $ft^3$ | 309.4 |
| Solution Volume in Oxidizer, $ft^3$ | 19.4 $ft^3$ |
| Displacement | |
| $H_2S$ Absorber, $ft^3$ | 50.0 |
| Oxidizer, $ft^3$ | 1.2 |

TABLE II

Material Balance Mol/Hr

Gas Flows

| | Gas In | Gas Out | ABS | Air In | Air Out | Oxid. | Total Gas Out |
|---|---|---|---|---|---|---|---|
| Inerts | 108.7[1] | 108.7 | — | — | — | — | 108.70 |
| $N_2$ + Argon | — | — | — | 2.82 | 2.82 | — | 2.82 |
| $O_2$ | — | — | — | 0.74 | 0.67 | −0.07 | 0.67 |
| $H_2S$ | 0.15 | — | −0.15 | — | — | — | — |
| $H_2O$ | 1.15 | 1.54 | +0.39 | 0.04 | 0.05 | +0.01 | 1.59 |
| $CO_2$ | — | — | — | — | — | — | — |
| | 110 | 110.24 | 0.24 | 3.60 | 3.54 | −0.06 | 113.78 |
| Lb/Hr | 1982.1 | 1984.3 | 2.2 | 103.4 | 101.3 | −2.1 | 2085.6 |
| Mol. Wt. | 18.01 | 18.0 | — | 28.7 | 28.6 | — | 18.33 |
| SCFM | 694.8 | 696.3 | — | 22.7 | 22.4 | — | 718.7 |
| Temp., °F. | 100 | 112 | — | 100 | 112 | — | 112 |
| Press., PSIG | 85 | 80 | — | 85 | 80 | — | 80 |
| ACFM | 110.3 | 118.9 | — | 3.61 | 3.82 | — | 122.7 |

| | Solution to Absorber | Absorber | Solution to Oxidizer | Settled Settler | Water Sulfur | Added | Solution to Absorber | Solution from Oxidizer | Total to Absorber |
|---|---|---|---|---|---|---|---|---|---|
| Water | 3,916.0 | −0.39 | 3,915.61 | 52.2 | 0.56 | 0.95 | 52.59 | 3,863.41 | 3,916.0 |
| S° | 12.2 | +0.14 | 12.34 | 0.16 | 0.14 | — | 0.02 | 12.18 | 12.2 |
| $Na_2S_2O_3$ | 49.8 | +0.01 | 49.81 | 0.66 | 0.01 | — | 0.65 | 49.15 | 49.8 |
| | 3,978.0 | −0.24 | 3,977.76 | 53.02 | 0.71 | 0.95 | 53.26 | 3,924.74 | 3,978.0 |
| Lb/Hr | 78,750.0 | −2.2 | 89,747.8 | 1,050 | 14.5 | 17.1 | 1,052.60 | 77,697.8 | 78,750 |
| Mol. Wt. | 19.8 | — | 19.8 | 19.8 | 20.6 | 18 | 19.76 | 19.8 | 19.8 |
| GPM | 150 | — | 150 | 2.0 | 0.02 | 0.03 | 2.01 | 148 | 150 |
| s.g. | 1.05 | — | 1.05 | 1.05 | 1.23 | 1.00 | 1.05 | 1.05 | 1.05 |
| Lb/Gal. | 8.75 | — | 8.75 | 8.75 | 10.24 | 8.33 | 8.75 | 8.75 | 8.75 |

[1] Assumed 18 Mol. Wt.

Figure 4:
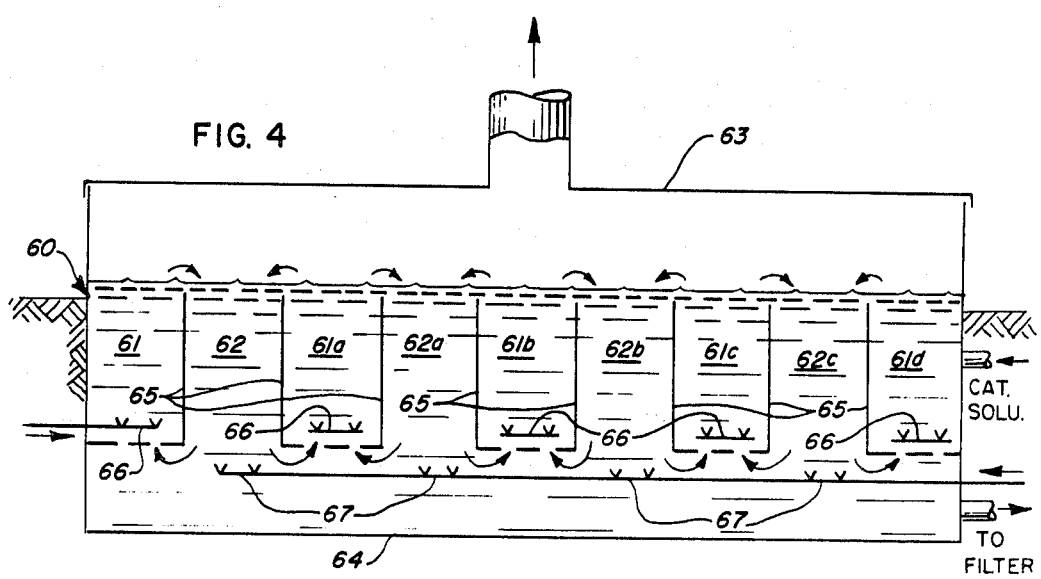
FIG. 4 is a schematic diagram of a further modified form of apparatus which can be used for carrying out the process of the present invention.

While a cylindrical reaction vessel with concentric cylindrical and annular reaction zones are preferred for small units because of the simplicity in mechanical design and relatively low construction costs, large units employing such a design are likely to involve serious liquid flow distribution problems. FIG. 4 of the drawing illustrates a large capacity unit suitable for practicing the process of the present invention in which a rectangular reaction vessel 60 is built largely below grade level and which is formed of a series of rectangular absorption reaction zones 61, 61a, 61b, 61c and a series of oxidizing reaction zones 62, 62a, 62b, 62c, in open flow communication at their upper and lower ends. The absorption and oxidation reaction zones are disposed in side-by-side relationship and are formed by spaced vertically mounted rectangular partition members 65 disposed at spaced points within the reaction vessel 60 with the upper and lower ends of the partition members 65 spaced from the upper and lower end walls 63, 64, respectively, of the vessel 60. Spargers 66 adapted to introduce a selected gas in a finely divided form into the absorption reaction zones 61, 61a, 61b, 61c are mounted adjacent the lower ends of said zones, and spargers 67 adapted to introduce another selected gas in a finely divided form into the oxidizing reaction zones 62, 62a, 62b, 62c, are disposed adjacent the lower ends of said zones. Each of said spargers 66, 67 has associated therewith means for controlling the rate of addition of each said gas to the respective reaction zones.

When the reaction vessel 60 is filled with a catalytic oxidation-reduction solution for absorbing hydrogen sulfide gas as shown in FIG. 4 and when the rate of flow of hydrogen sulfide containing gas to the reaction zones 61, 61a, 61b, 61c is controlled to establish a positive differential head of about 60 pounds per square foot relative to the flow of oxygen containing gas in the oxidizer reaction zones, an upwardly flow of the catalytic reaction solution is established in ech of the absorption zones 61, 61a, 61b, 61c due to the lower density of the liquid therein. Simultaneously, the catalytic reaction solution flows downwardly in the contiguous oxidation reaction zones 62, 62a, 62b, 62c, 62d so that there is a continuous circulation of the catalytic reaction solution within the reaction vessel in the several contiguous absorption and oxidation reaction zones along the length of the reaction vessel 60.

The process and apparatus of the present invention have been described in connection with a continuous process for removing hydrogen sulfide gas from a process gas stream, but it should be understood that the invention can be applied to effect other chemical reactions with a liquid reagent and gases where it is necessary to regenerate the liquid reagent by treating with a gaseous medium after the liquid reagent has been reacted with another gaseous medium and recycling the regenerated liquid reagent to the original reaction zone, such as when continuously removing a mercaptan from a process gas stream by an oxidation-reduction process. In each of the applications of the process the absorption efficiency is high when using a low concentration (500 ppm) of the catalytic metal, such as iron or vanadium.

I claim:

1. In an apparatus for continuously chemically reacting a liquid reagent sequentially with two different gases in a single reaction vessel, the improvement comprising; a vertically disposed reaction vessel having vertically extending lateral walls and interconnecting upper and lower end walls adapted to hold a quantity of a liquid reagent, divider walls spaced inwardly from said lateral walls extending generally parallel to said lateral walls defining an inner reaction chamber and an outer reaction chamber, said divider walls having the upper and lower ends thereof spaced axially inwardly from the proximate upper and lower end walls of said vessel whereby said inner reaction chamber and said outer reaction chamber are in uninterrupted two way liquid flow communication at their upper and lower ends within said vessel when said vessel is filled with said liquid reagent to a level above the upper end of said divider walls, a first gas inlet means disposed adjacent the lower end of said inner reaction chamber adated for introducing a first reactive gas into said vessel at a controllable rate sufficient to reduce the density of said liquid reagent in said inner reaction zone below the density of the liquid in said outer reaction chamber and a second gas inlet means disposed adjacent the lower end of said outer reaction chamber adapted for introducing a second reactive gas into said vessel at a controllable rate sufficient to reduce the density of said liquid reagent in said outer reaction zone below the density of the liquid in said inner reaction chamber, each said gas inlet means being disposed relative to said reaction chambers so that gas discharged therefrom enters only the said reaction chamber proximal to the said gas inlet means, means for removing gas from the upper end of said vessel, means for removing at least a portion of said reaction solution and a solid reaction product from the lower end of said vessel, and each said gas inlet means having associated therewith control means for discharging said first gas at a rate different from the discharge rate of said second gas for making the density of said liquid reagent in either of said reaction chambers less than the density of said liquid reagent in the other of said reaction chambers; whereby the liquid reagent in either of said reaction chambers can be made to flow countercurrent to the upward flow of gas therein and thereby effecting greater control over the chemical reactions in the respective chambers.

2. An apparatus as in claim 1, wherein said lateral walls and said divider walls have a cylindrical configuration with said divider walls disposed concentrically with said lateral walls, and said lateral walls and said divider walls together defining said outer chamber having an annular configuration around said central reaction chamber.

3. An apparatus as in claim 1, wherein said lateral walls of said reaction vessel and said divider walls define reaction chambers having a rectangular configuration.

4. An apparatus as in claim 1, wherein the control means associated with said second gas inlet means disposed in said outer reaction chamber is adapted to discharge said second reactive gas into said outer chamber at a rate sufficient to make the density of said liquid reagent in said outer reaction chamber less than the density of liquid reagent in said inner reaction chamber while said first gas inlet means is adapted to discharge said first reactive gas into said inner reaction chamber; at a rate which maintains the flow of liquid reagent in said inner reaction chamber countercurrent to the flow of gas in said inner reacton chamber.

* * * * *